(12) United States Patent
Jung et al.

(10) Patent No.: US 9,592,787 B2
(45) Date of Patent: Mar. 14, 2017

(54) AIRBAG FOR KNEE AIRBAG APPARATUS

(71) Applicant: Autoliv Development AB, Vargarda (SE)

(72) Inventors: Doo Seob Jung, Hwaseong-si (KR); Do-Gwan Kim, Osan-si (KR)

(73) Assignee: AUTOLIV DEVELOPMENT AB, Vargarda (SE)

(*) Notice: Subject to any disclaimer, the term of this patent is extended or adjusted under 35 U.S.C. 154(b) by 0 days.

(21) Appl. No.: 14/781,674

(22) PCT Filed: Mar. 28, 2014

(86) PCT No.: PCT/KR2014/002675
§ 371 (c)(1),
(2) Date: Oct. 1, 2015

(87) PCT Pub. No.: WO2014/163337
PCT Pub. Date: Oct. 9, 2014

(65) Prior Publication Data
US 2016/0059815 A1    Mar. 3, 2016

(30) Foreign Application Priority Data

Apr. 3, 2013 (KR) .................... 10-2013-0036339

(51) Int. Cl.
*B60R 21/231* (2011.01)
*B60R 21/045* (2006.01)
(Continued)

(52) U.S. Cl.
CPC .......... *B60R 21/231* (2013.01); *B60R 21/045* (2013.01); *B60R 21/206* (2013.01);
(Continued)

(58) Field of Classification Search
CPC . B60R 21/231; B60R 21/2338; B60R 21/237; B60R 21/206; B60R 2021/23382; B60R 2021/23169
See application file for complete search history.

(56) References Cited

U.S. PATENT DOCUMENTS 6,945,562 B2    9/2005 Abe
7,207,594 B2    4/2007 Igawa et al.
(Continued)

FOREIGN PATENT DOCUMENTS

JP    2003-237525 A    8/2003
JP    2007-203937 A    8/2007
(Continued)

OTHER PUBLICATIONS

Intenational Search Report for PCT/KR2014/02675, ISA KR, Daejeon, mailed Aug. 13, 2014.
(Continued)

*Primary Examiner* — Darlene P Condra
(74) *Attorney, Agent, or Firm* — Stephen T. Olson; Harness, Dickey & Pierce, P.L.C.

(57) ABSTRACT

An airbag for a knee airbag apparatus which is rapidly deployed upward between the knees of a passenger and instrument panel includes a front panel; a rear panel coupled to the front panel to form an inflation chamber; and a hinge portion having a thin inflation thickness at a position corresponding to a housing connecting portion, at which the instrument panel is coupled to the housing, when the airbag is inflated.

20 Claims, 12 Drawing Sheets

(51) Int. Cl.
*B60R 21/206* (2011.01)
*B60R 21/237* (2006.01)
*B60R 21/2338* (2011.01)

(52) U.S. Cl.
CPC ........ *B60R 21/237* (2013.01); *B60R 21/2338* (2013.01); *B60R 2021/23169* (2013.01); *B60R 2021/23382* (2013.01)

(56) References Cited

U.S. PATENT DOCUMENTS

| | | | |
|---|---|---|---|
| 7,549,671 B2 | 6/2009 | Mizuno et al. | |
| 7,758,067 B2 | 7/2010 | Narin et al. | |
| 7,963,550 B2* | 6/2011 | Hong | B60R 21/206 |
| | | | 280/729 |
| 8,100,433 B2 | 1/2012 | Shimono | |
| 8,302,991 B2 | 11/2012 | Hong et al. | |
| 8,444,177 B2 | 5/2013 | Wallat et al. | |
| 8,505,969 B2 | 8/2013 | Mendez | |
| 8,622,418 B2 | 1/2014 | Chun et al. | |
| 8,960,713 B2 | 2/2015 | Kim et al. | |
| 8,998,249 B2 | 4/2015 | Tanaka et al. | |
| 9,022,416 B2 | 5/2015 | Wallat et al. | |
| 2003/0155759 A1 | 8/2003 | Abe | |
| 2005/0151351 A1 | 7/2005 | Enders et al. | |
| 2007/0182134 A1 | 8/2007 | Mizuno et al. | |
| 2007/0200320 A1* | 8/2007 | Keshavaraj | B60R 21/206 |
| | | | 280/730.1 |
| 2007/0246920 A1* | 10/2007 | Abele | B60R 21/206 |
| | | | 280/730.1 |
| 2008/0157509 A1* | 7/2008 | Abe | B60R 21/233 |
| | | | 280/730.1 |
| 2009/0134611 A1 | 5/2009 | Wigger et al. | |
| 2009/0152847 A1 | 6/2009 | Hong et al. | |
| 2010/0270779 A1* | 10/2010 | Enders | B60R 21/2338 |
| | | | 280/730.1 |
| 2011/0012327 A1* | 1/2011 | Enders | B60R 21/231 |
| | | | 280/730.1 |
| 2011/0095512 A1 | 4/2011 | Mendez | |
| 2011/0101660 A1 | 5/2011 | Schneider et al. | |
| 2011/0109070 A1* | 5/2011 | Tanaka | B60R 21/206 |
| | | | 280/741 |
| 2011/0251039 A1 | 10/2011 | Hong et al. | |
| 2011/0260434 A1* | 10/2011 | Gottschalk | B60R 21/206 |
| | | | 280/730.2 |
| 2012/0025496 A1* | 2/2012 | Schneider | B60R 21/201 |
| | | | 280/728.2 |
| 2012/0025498 A1 | 2/2012 | Tanaka | |
| 2012/0205898 A1* | 8/2012 | Picard | B60R 21/2338 |
| | | | 280/730.1 |
| 2013/0313810 A1* | 11/2013 | Chun | B60R 21/231 |
| | | | 280/730.1 |
| 2016/0046253 A1 | 2/2016 | Jung et al. | |
| 2016/0052480 A1 | 2/2016 | Jung et al. | |

FOREIGN PATENT DOCUMENTS

| | | |
|---|---|---|
| JP | 2011-136682 A | 7/2011 |
| KR | 10-2009-0065957 A | 6/2009 |

OTHER PUBLICATIONS

International Search Report and Written Opinion for PCT/KR2014/002685, ISA, ISA/KR, Daejeon, mailed Aug. 13, 2014.

* cited by examiner

AIRBAG FOR KNEE AIRBAG APPARATUS

CROSS-REFERENCE TO RELATED APPLICATIONS

This application is a 371 U.S. National Stage of International Application No. PCT/KR2014/002675, filed Mar. 28, 2014, which claims the benefit of Korean Patent Application No. 10-2013-0036339, filed Apr. 3, 2013. The entire disclosures of the above applications are incorporated herein by reference.

TECHNICAL FIELD

The present invention relates to a knee airbag apparatus. More particularly, the present invention relates to an airbag for a knee airbag apparatus which is manufactured to allow a rear panel of the airbag to have a length longer than that of a front panel, so that the airbag deploys upward along an instrument panel.

BACKGROUND ART

A knee airbag apparatus protects legs of a passenger upon a collision by deploying an airbag between an instrument panel and the lower legs, for example, tibias of the passenger.

The airbag prevents a passenger from colliding with the instrument panel at a high acceleration upon a vehicle collision. The instrument panel is made of a high stiffness material so a high force is applied to the legs of the passenger when the passenger collides with the instrument panel at a high acceleration.

The airbag allows the passenger to collide with the airbag instead of the components of a vehicle, so that relatively low impact is applied to the passenger.

The knee airbag apparatus, which is located behind the instrument panel, is configured to be deployed through a door or chute placed on a surface of the instrument panel.

To the contrary, the knee airbag apparatus, which is installed at a low portion of the instrument panel, is deployed toward the bottom of the vehicle at the first stage, and then, is deployed upward along the instrument panel of the vehicle (this knee airbag apparatus is called a low mounting knee airbag apparatus).

Thus, the study and research have been performed on various deployment paths of the knee airbag apparatus for effectively deploying the airbag of the knee airbag apparatus toward an upper portion of a vehicle along a shape of an instrument panel.

(Patent document 1) U.S. Patent publication No. 2012/0025498 A1

DISCLOSURE OF INVENTION

Technical Problem

Accordingly, it is an object of the present invention to provide an airbag for a knee airbag apparatus in which, when the airbag is deployed, an airbag is deployed more rapidly toward an upper portion of a vehicle by inducing the airbag to be erected about a portion where a housing is coupled to an instrument panel.

Further, it is another object of the present invention to provide an airbag for a knee airbag apparatus which utilizes a seam margin generated in fabricating an airbag as a deployment guide member to induce the airbag to be deployed upward without forming the deployment guide member using an additional member.

Solution to Problem

According to the present invention, there is provided an airbag for a knee airbag apparatus, The airbag includes a front panel; a rear panel coupled to the front panel to form an inflation chamber; and a hinge portion having a thin inflation thickness at a position corresponding to a housing connecting portion, at which the instrument panel is coupled to the housing, when the airbag is inflated.

The first and second tethers may be disposed to form a predetermined angle about the housing connecting portion when the airbag is inflated.

The hinge portion may include the first tether having one end which is sewed to a portion of the front panel corresponding to the housing connecting portion; and the second tether having one end sewed to the front panel in adjacent to the one end of the first tether.

The housing connecting portion may be a low portion of the instrument panel which is formed in parallel with a bottom of the vehicle, the one end of the first tether may be sewed to be positioned at a front of the housing connecting portion when the airbag is inflated and an opposite end of the first tether may be sewed to the rear panel to face the bottom of the vehicle, and the one end of the second tether may be sewed to a rear of the housing connecting portion when the airbag is inflated and an opposite end of the second tether faces tibias of a passenger.

The airbag may further include a deployment guide member defined by seam margins of the front and rear panels formed at both sides of the hinge portion such that a pulling force is generated to allow the airbag to be deployed upward toward the instrument panel.

The front and rear panels may be fabricated as one piece such that the front and rear panels face each other through a first folding line, a vertical length from the first folding line to an upper end of the rear panel may be longer than a length from the first folding line to an upper end of the front panel, the front and rear panels may include a front inclined end and a rear inclined end, respectively, which are gradually inclined outward from the first folding line to upper ends of the front and rear panels, the front and rear panels may include front and rear flaps protruding outward from the front and rear inclined ends and symmetrical to each other about the first folding line, where the front and rear flaps may include: lower ends placed in the front and rear panels when the front and rear flaps are folded in a horizontal direction at a position spaced apart from the first folding line; and side ends corresponding to the front and rear inclined ends, and the lower ends may be gradually inclined toward upper ends of the front and rear panels in an outward direction.

The airbag may further include: a first sewing line for sewing lower portions of the front and rear panels folded about the first folding line; a second sewing line connected to the first sewing line for sewing lower ends of the front and rear flaps; and a third sewing line formed by sewing the front and rear panels along peripheries of the front and rear panels after lower portions of the front and rear panels are folded on the front panel such that the side ends of the front and rear flaps correspond to the front and rear inclined ends and the upper ends of the front and rear panels are aligned correspondingly to each other.

Advantageous Effects of Invention

As described above, according to the present invention, the airbag of the low mounting knee airbag apparatus includes a deployment plane concaved toward a position corresponding to the connecting portion between the instrument panel and the housing, so that the upward deployment of the airbag can be rapidly induced.

According to the present invention, the airbag of the low mounting knee airbag apparatus can be induced to be deployed upward by using the seam margin and the sewing lines of the front and rear panels so that an additional deployment guide member may not be required.

As a result, the number of components and the fabrication cost can be reduced, the fabrication method can be simplified, and the airbag induced to be erected upward can be fabricated.

BRIEF DESCRIPTION OF DRAWINGS

FIG. 6b is a sectional view taken along line 6b-6b of FIG. 6a;

FIG. 7b is a sectional view taken along line 7b-7b of FIG. 7a;

FIG. 8a is a view showing a state of folding a front panel along arrow A with respect to the first folding line F1 of FIG. 7a;

FIG. 8b is a sectional view taken along line 8b-8b of FIG. 8a;

FIG. 9b is a sectional view taken along line 9b-9b of FIG. 9a;

FIG. 10a is a view showing a state of adjusting positions of top ends of the front and rear panels in a state of folding low portion of the front and rear panels along arrow B with respect to a virtual line V of FIG. 9a;

FIG. 10b is a sectional view taken along line 10b-10b of FIG. 10a;

FIG. 11b is a sectional view taken along line 11b-11b of FIG. 11a.

MODE FOR THE INVENTION

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention.

In the following description, directional terms described below, such as upper direction, lower direction, forward direction, and rearward direction, will be defined based on an airbag housing in a state that the airbag housing is coupled to a low portion of an instrument panel. That is, a direction toward the roof of a vehicle is defined as an upper direction (U), a direction toward the bottom of a vehicle is defined as a lower direction (L), a direction toward a passenger is defined as a rearward direction (R), and a direction toward a front of a vehicle is defined as a forward direction (F).

Figure 1:
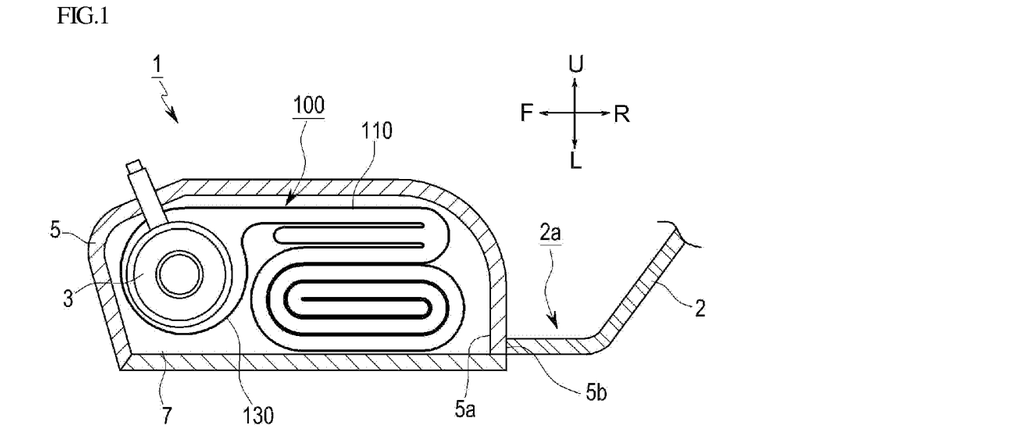
FIG. 1 is a longitudinal sectional view showing a folded state of an airbag of a knee airbag apparatus according to an embodiment of the present invention.

FIG. 1 is a longitudinal sectional view showing a folded state of an airbag of a knee airbag apparatus according to an embodiment of the present invention.

Figure 2:
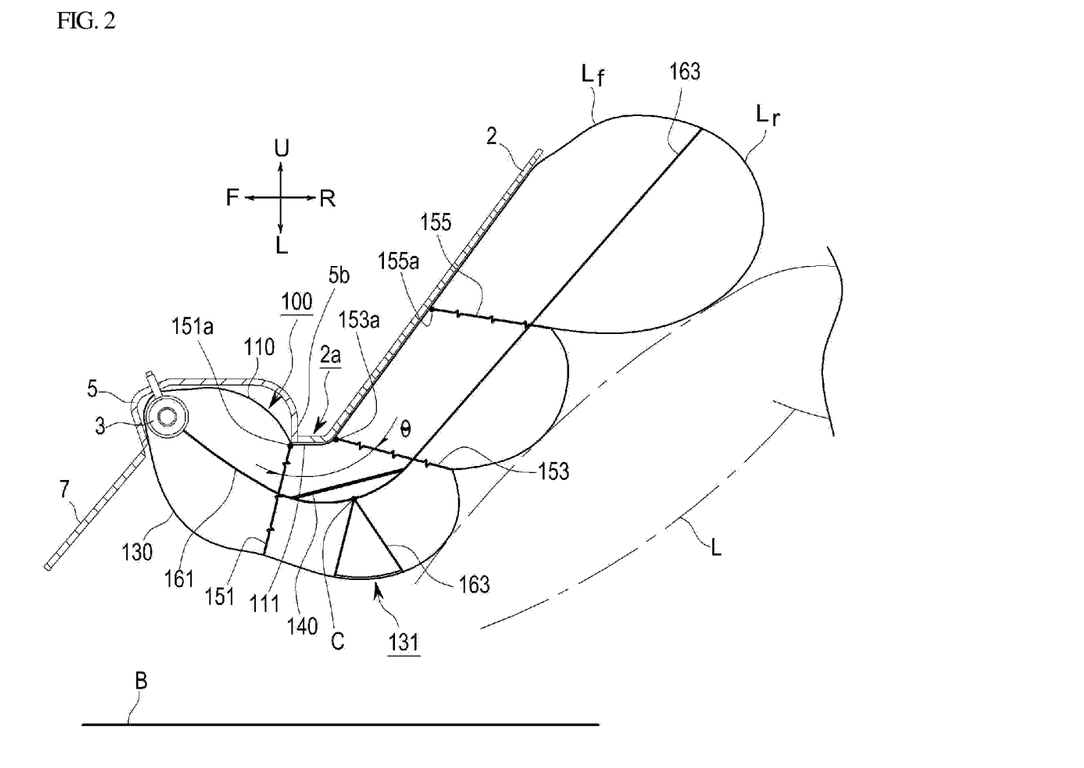
FIG. 2 is a longitudinal sectional view showing an inflated state of an airbag of a knee airbag apparatus according to an embodiment of the present invention.

Referring to FIGS. 1 and 2, the knee airbag apparatus 1 is installed at a low portion of an instrument panel 2.

The Knee airbag apparatus 1 includes an airbag 100, an inflator 3 for supplying gas to the airbag 100 upon collision of a vehicle, an airbag housing 5 for receiving the airbag 100 and the inflator 3, and a door 7 for covering an opening 5a in the airbag housing 5.

The airbag 100 includes a front panel 110 which is neighbors on the instrument panel 2 and a rear panel 130 which neighbors on low legs L of a passenger when the airbag 100 is inflated.

A vertical length Lf of the front panel 130 is shorter than a length Lr of the rear panel 130. Thus, when the front and rear panels 110 and 130 are coupled correspondingly to each other, a wrinkle portion 131, which is unfolded when inflating the airbag, is formed at the rear panel 130.

The wrinkle portion 131 is formed at a low portion of the rear panel 130 in a horizontal direction, such that the wrinkle portion 131 is unfolded near a housing connecting portion 2a to which the housing 5 and the instrument panel 2 are coupled. The front panel 110 includes a portion 111 that is unfolded adjacent the housing connection portion 2a.

A plurality of tethers (for example, first to third tethers 151 to 155) are connected between the front and rear panels 110 and 130 and are spaced apart from each other by a predetermined gap such that the forward and rearward deployments of the airbag 110 may be restrained.

Preferably, when the airbag 100 is inflated, the first tether 151 is unfolded from a portion 2a (hereinafter, referred to as housing connecting portion) in which a rear end 5a of the housing 5 and the instrument panel 2 are coupled to each other, toward the bottom of the vehicle in a substantially vertical direction, and the second tether 153 is unfolded from the housing connecting portion 2a toward a low legs of a passenger in a horizontal direction.

The housing connecting portion 2a may be included in a low portion of the instrument panel 2 which is formed in parallel with the bottom of the vehicle.

One end of the first tether 151 may be connected to one position of the front panel 110 corresponding to a front end of the housing connecting portion 2a through a first tether sewing line 151a, and one end of the second tether 153 may be connected to another position of the front panel 110 corresponding to a rear end of the housing connecting portion 2a through a second tether sewing line 153a.

When the airbag is inflated, the other end of the first tether 151 may be sewed to one side of the rear panel 130 to be unfolded toward the bottom of the vehicle, and the other end of the second tether 153 may be sewed to the other side of the rear panel 130 to be unfolded toward the tibias of the passenger.

As configured above, a predetermined angle θ is formed between the first and second tethers 151 and 153 about the housing connecting portion 2a when the airbag 100 is inflated.

As described above, the inflation thickness of the airbag 100 corresponding to the housing connecting portion 2a of the instrument panel 2 is relatively thinned by the first and second tethers 151 and 153 connected to each other. Thus, a portion between the front and rear panel 110 and 130 performs a function of a hinge portion of deploying the airbag 100 upward at an inclination angle along the shape of the instrument panel 2.

Reference numeral 155a denotes a third tether sewing line which allows the third tether 155 to be coupled to the front panel 110.

The third tether sewing line 155a is disposed in parallel with the second tether 153 when the airbag 100 is inflated.

The instrument panel 2 may include the housing connecting portion 2a substantially in parallel with the bottom of the vehicle. Further, in the state of removing the housing connecting portion 2a of the instrument panel 2, the rear end 5b of the housing 5 may make direct contact with the low end of the instrument panel 2 which is inclined upward.

The knee airbag apparatus 1 may be a low mounting knee airbag apparatus which is installed at a low portion of the instrument panel 2 of driver and passenger seats to allow the airbag 100 to be deployed upward after the airbag 100 is initially deployed toward the bottom B of the vehicle.

In addition, the knee airbag apparatus 1 may be installed below a steering wheel at the driver seat side or at various positions such as a rear side of the vehicle.

Figure 3:
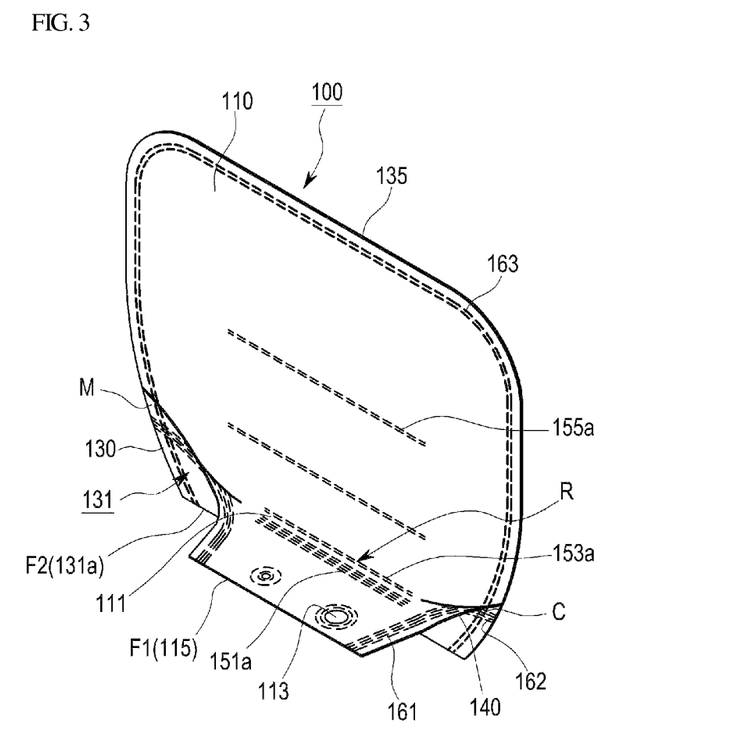
FIG. 3 is a perspective view showing a non-inflated state of an airbag of a knee airbag apparatus according to an embodiment of the present invention.

FIG. 3 is a perspective view showing a deployment state of the knee airbag apparatus according to an embodiment of the present invention.

Referring to FIG. 3, the hinge portion R, which has a relatively thin inflation thickness when the airbag 100 is inflated, is formed at a low portion of the airbag 100.

The hinge portion R is formed between the first tether sewing line 151a and the second tether sewing line 153a spaced apart from the first tether sewing line 151a by a predetermined gap.

As the hinge portion R has the relatively thin inflation thickness, a concave portion is formed in the deployment shape of the inflated airbag.

A deployment guide member 140 is provided at both sides of the airbag 100 to generate a pulling force for inflating the airbag 100 upward when the airbag 100 is inflated. A margin M, which remains after the front and rear panels 110 and 130 of the airbag 100 are sewed, serves as the deployment guide member 140.

As described above, the hinge portion R may be obtained by sewing the first and second tethers 153 and 155 along the first and second tether sewing lines 151a and 153a.

Further, the hinge portion R may be formed by allowing the front and rear panels 110 and 130 to make contact with each other and be sewed.

Figure 4:
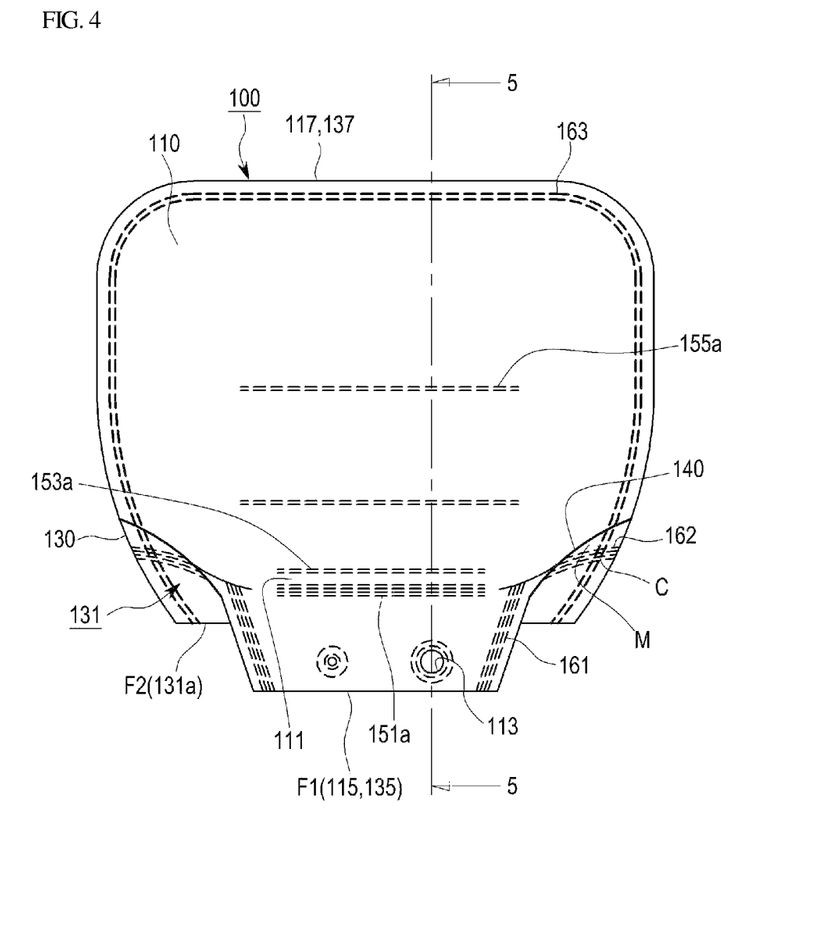
FIG. 4 is a front view showing an airbag of a knee airbag apparatus according to an embodiment of the present invention.
Figure 5:
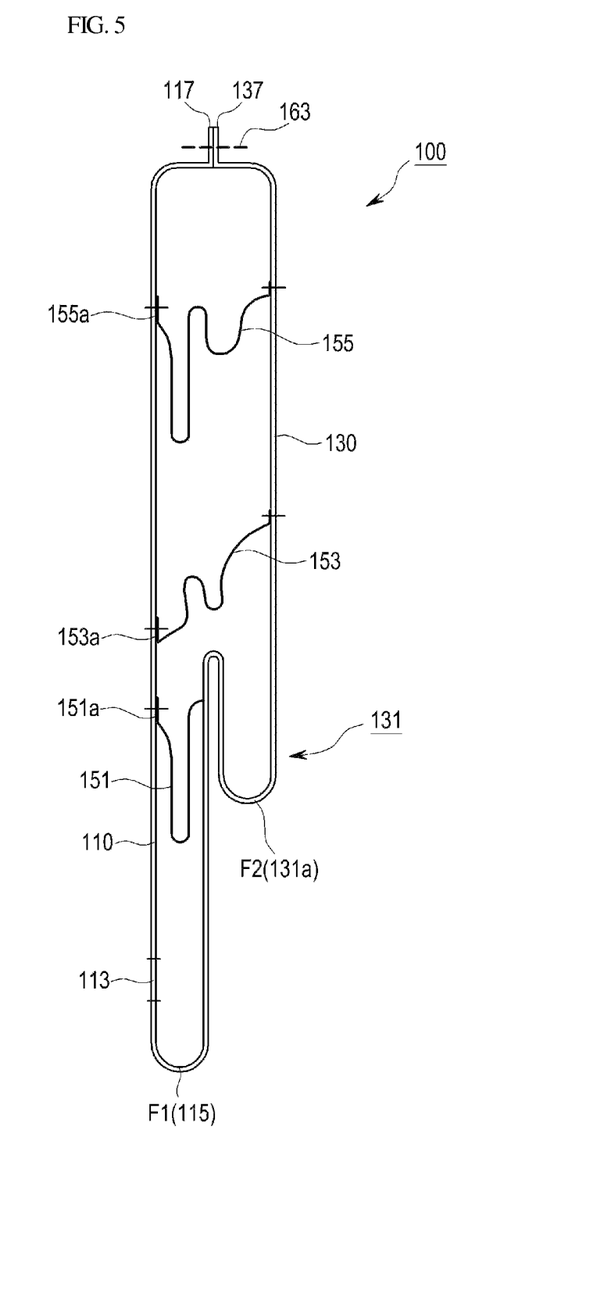
FIG. 5 is a sectional view taken along line 5-5 of FIG. 4.

FIG. 4 is a front view showing an airbag of a knee airbag apparatus according to an embodiment of the present invention. FIG. 5 is a sectional view taken along line 5-5 of FIG. 4.

Referring to FIGS. 4 and 5, the airbag 100 includes a front panel 110 having an inflator insertion hole 113 and a rear panel 130 having a shape corresponding to the front panel 110 and the wrinkle portion 131 formed by folding a portion of a low portion thereof in a horizontal direction.

The front and rear panels 110 and 130 are formed of one piece by folding the one piece having a substantially corresponding shape with respect to a first folding line F1 in a central portion of them.

The first folding line F1 corresponds substantially to low ends 115 and 135 of the front and rear panels 110 and 130.

The airbag 100 includes a firs sewing line 161 formed by sewing low portions of the front and second panels 110 and 130 which are overlapped by folding the front and second panels 110 and 130 with respect to the first folding line F1, and a second sewing line 162 which extends from the first sewing line 161 and is formed by sewing the front and rear panels 110 and 130 in parallel with the first folding line F1.

In the airbag 100, the firs folding line F1 is positioned on the top surface of the front panel 110 by folding the low portions of the front and rear panels 110 and 130 upward to the front panel 110 (the state of FIG. 10b), the second folding line F2 is formed in the rear panel 130 by fitting the upper end of the rear panel 130 to the upper end of the front panel 110, and then, a third sewing line 163 is formed by sewing the front and rear panel 110 and 130 along peripheries of the front and rear panel 110 and 130.

The second folding line F2 corresponds substantially to a low end 131a of the wrinkle portion 131 of the rear panel 130.

A cross point C is formed at a position corresponding to that of the wrinkle portion 131 by crossing the second and third sewing lines 162 and 163. The cross point C performs a function of a hinge point of guiding the airbag 100 to be deployed upward according to the shape of the instrument panel 2 when the airbag 100 is inflated (refers to FIG. 2).

A deployment guide member 140, which guides the airbag 100 to be stood upward, may be additionally provided on a portion at which the second sewing line 162 of the front and rear panels 110 and 130 are formed.

The deployment guide member 140 may be implemented by longitudinally forming the margin M toward an upper portion of the airbag, which is formed at a portion on which the second sewing line 162 of the front and rear panels 110 and 130 is formed.

Hereinafter, a method, which fabricates the airbag of the knee airbag apparatus configured above, will be described in more detail.

FIGS. 6a to 11b are views showing a process of fabricating an airbag of a low mounting airbag apparatus according to an embodiment of the present invention.

In the following description, the directional terms, such as "upper end", "lower end", "vertical direction", "horizontal direction" and the like will be defined as follows. In detail, in a state that the non-inflated airbag is unfolded on a plane, a portion adjacent to a portion connected to an inflator is defined as a lower portion, an end of the lower portion is defined as a lower end, a portion facing the lower portion is defined as an upper portion, an end of the upper portion is defined as an upper end, a direction parallel with the upper end of the airbag is defined as a horizontal direction, and a direction perpendicular to the horizontal direction is defined as a vertical direction.

Figure 6A:
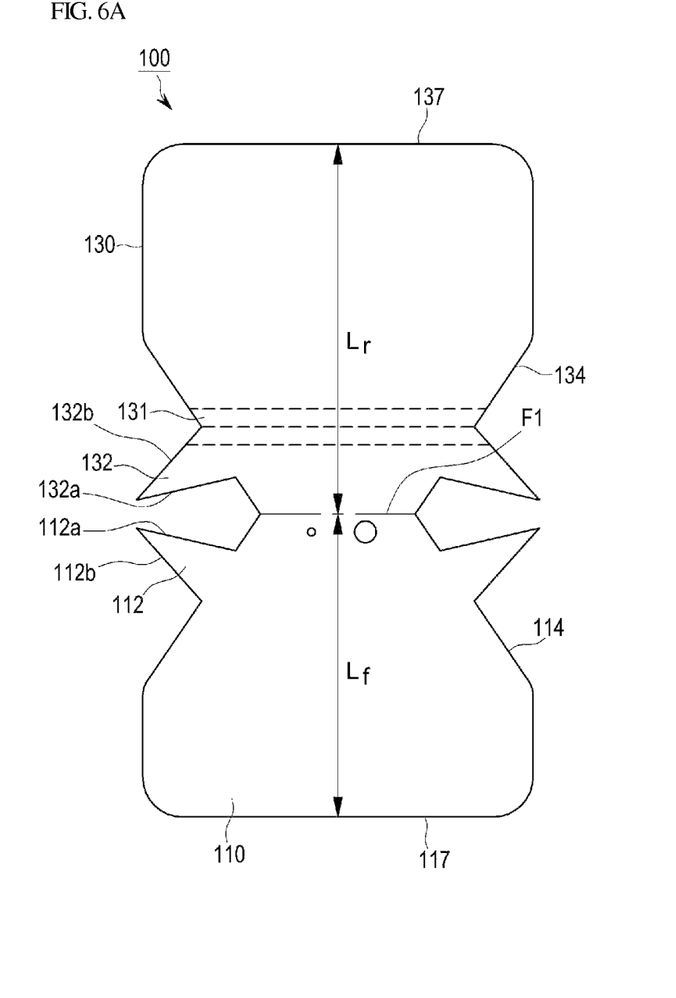
FIG. 6a is a development view of the airbag of FIG. 3.
Figure 6B:
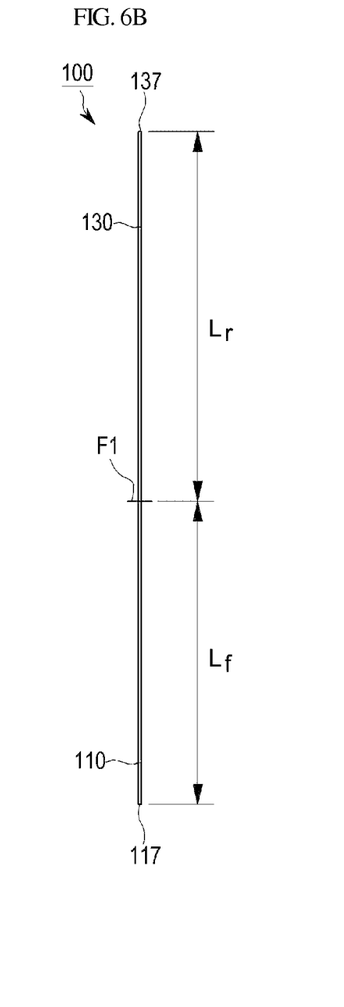

Referring to FIGS. 6a and 6b, the front and rear panels 110 and 130 constituting the airbag 100 are formed of one piece by folding the one piece with respect to the first folding line F1 provided at the substantially central portion of the front and rear panels 110 and 130.

The front panel 110 has a vertical length Lf from the first folding line F1 to the top end of the front panel 110, and the rear panel 130 has a vertical length Lr from the first folding line F1 to the top end 137 of the rear panel 130.

The vertical length Lr of the rear panel 130 is longer than the vertical length Lf of the front panel 110 so that the rear panel 130 has the wrinkle portion 131.

The front and rear panels 110 and 130 have a front inclined end 114 and a rear inclined end 134 which are gradually inclined upward at low edges of them. Therefore, the front and rear panels 110 and 130 are substantially formed in a trapezoid shape.

The front and rear panels 110 and 130 include front and rear flaps 112 and 132 which are protruded from the front and rear inclined ends 114 and 134 to an outside and are symmetrical to each other with respect to the first folding line F1.

The front and rear flaps 112 and 132 include low ends 112a and 132a placed in the front and rear panels 110 and 130 when the front and rear panels 110 and 130 are folded at a place spaced apart from the first folding line F1 by a predetermined distance, and side ends 112b and 132b corresponding to the front and rear inclined ends 114 and 134.

Preferably, the low ends 112a and 132a of the front and rear flaps 112 and 132 are formed to be inclined toward the upper ends of the front and rear panels 110 and 130.

Figure 7A:
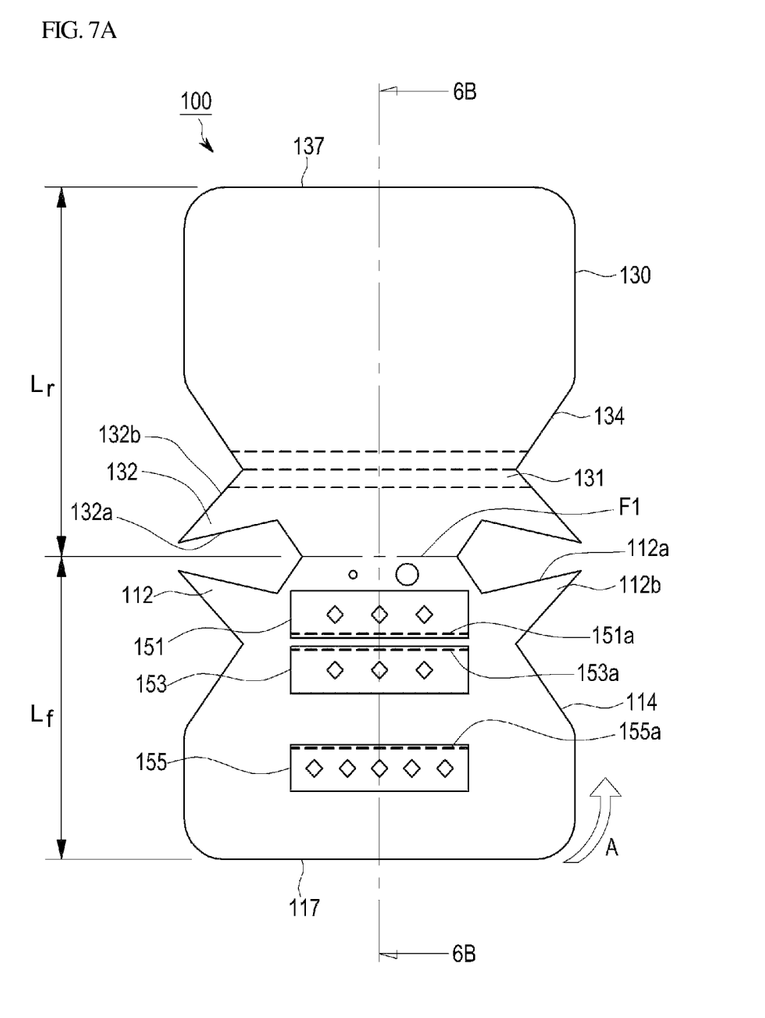
FIG. 7a is a development view showing a state of connecting a tether to a front panel of an airbag according to an embodiment of the present invention.
Figure 7B:
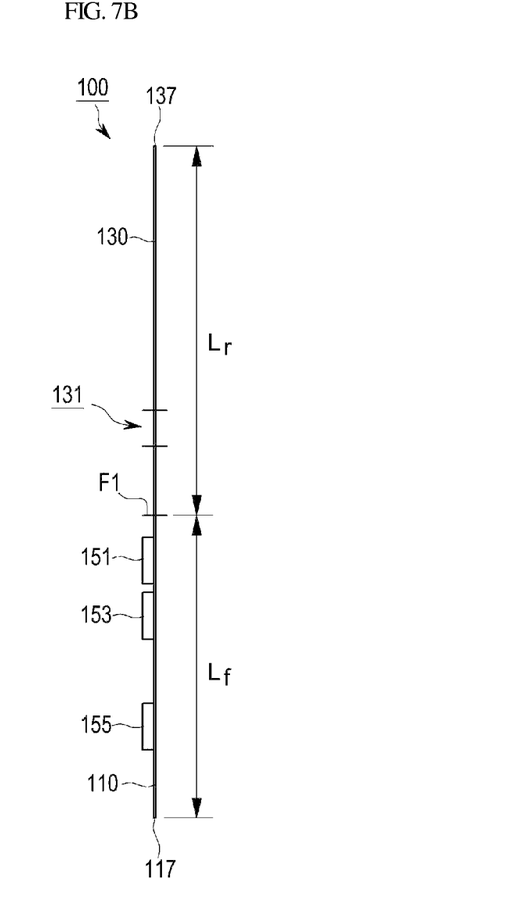

Referring to FIGS. 7a and 7b, ends of the first to third tethers 151, 153 and 155 are connected to inner surfaces of the front and rear panels 110 and 130 through the first to third tether sewing lines 151a, 153a and 155a.

Although the state of connecting the first to third tethers 151, 153 and 155 to the front panel 110 is only shown in the drawings for easy description, the opposite ends of the first to third tethers 151, 153 and 155 are connected to the rear panel 130 in a similar manner.

Figure 8A:
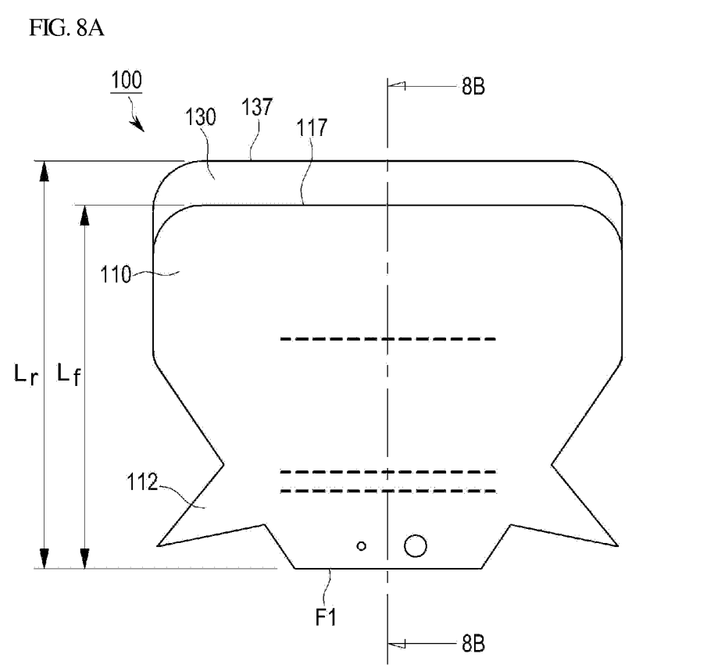
Figure 8B:
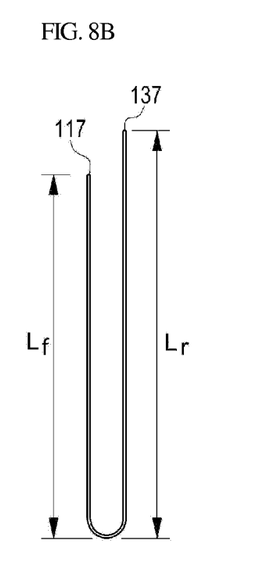

Referring to FIGS. 8a and 8b, the front panel 110 overlaps the rear panel 130 by folding the front panel 110 on the inner surface of the rear panel 130 along arrow A with respect to the first folding line F1, so that the front and rear flaps 112 and 132 are overlapped.

The vertical length Lr of the rear panel 130 is longer than the vertical length Lf of the front panel 110, so that the top end 137 of the rear panel 130 is located at a higher position than that of the top end 117 of the front panel 110.

Figure 9:
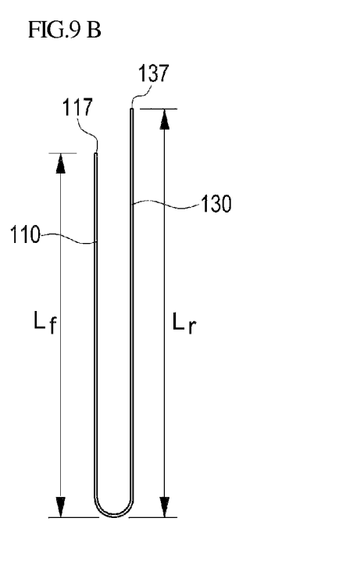
Figure 9A:
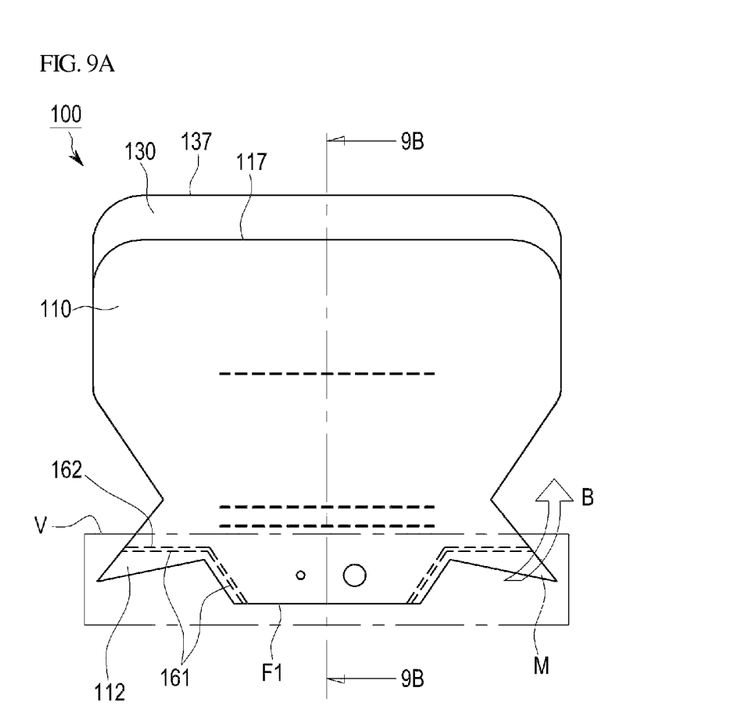
FIG. 9a is a view showing a state of coupling low portions of the front and rear panels according to an embodiment of the present invention.

Referring to FIGS. 9a and 9b, both sides of the low portions of the front and rear panels 110 and 130 overlapped through the first sewing line 161 are connected to each other, and the second sewing line 162 extending from the first sewing line 161 is formed in the front and rear flaps 112 and 132 so that the front and rear flaps 112 and 132 are combined with each other. The second sewing line 162 is formed in parallel with the first folding line F1 substantially in a horizontal direction.

Continuously, the low portions of the front and rear panels 110 and 130 are folded in the direction of arrow B with respect to virtual line V denoted over the second sewing line 162, so that the first folding line F1 is placed on the external top surface of the front panel 110.

Figure 10A:
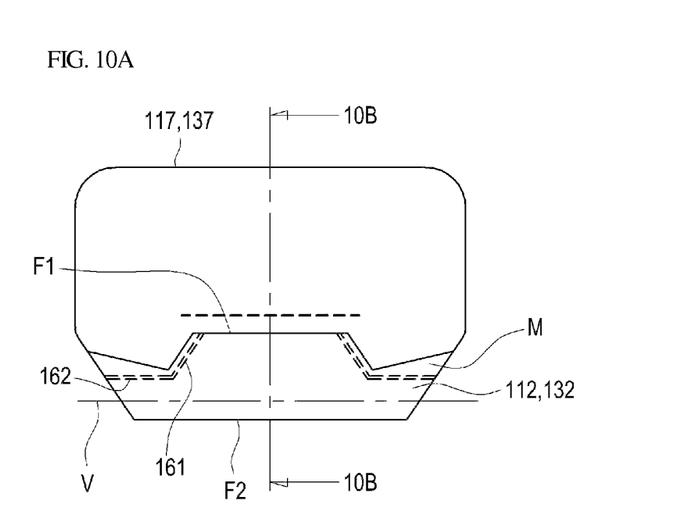
Figure 10B:
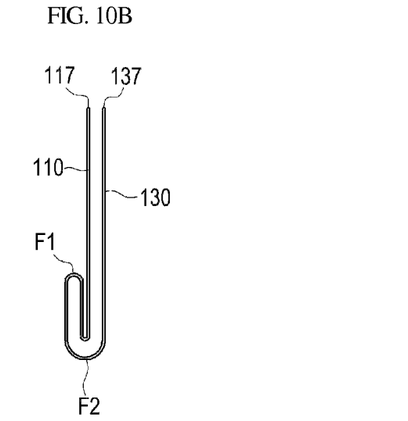

Referring to FIGS. 10a and 10b, in the state that the low portions of the front and rear panels 110 and 130 are folded with respect to the virtual line V, the rear panel 130 is allowed to move such that the top end 117 of the front panel 110 corresponds to the top end 137 of the rear panel 130.

Thus, the rear panel 130 is folded under the virtual line V so that the second folding line 130 is formed. The second folding line F2 serves as the bottom end 131a of the wrinkle portion 131 shown in FIG. 4.

Figure 11A:
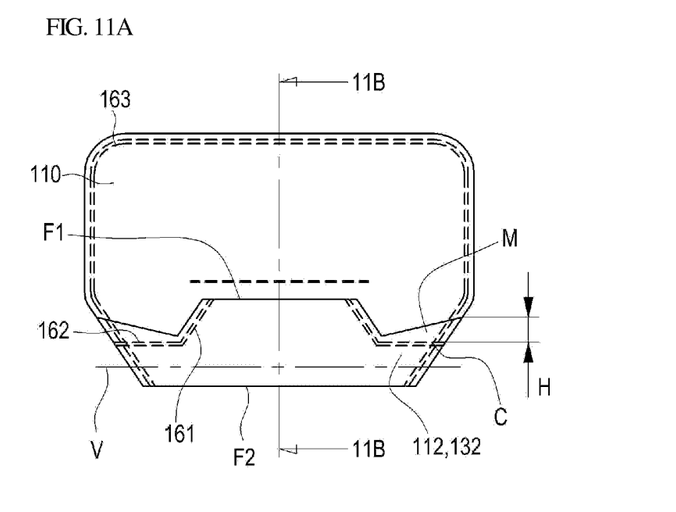
FIG. 11a is a view showing a state of sewing peripheries of the front and rear panels of the airbag according to an embodiment of the present invention.
Figure 11B:
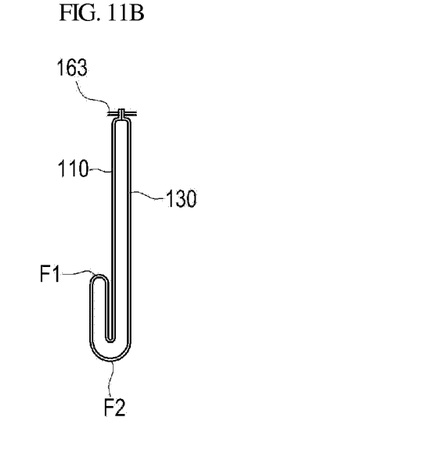

Referring to FIGS. 11a and 11b, the third sewing line 163 is formed by sewing them from one side of the second folding line F2 to on opposite side of the second folding line F2 along the edges of the front and rear panels 110 and 130.

The cross point C is formed by crossing the third sewing line 163 and the second sewing line 162 formed at the front and rear flaps 112 and 132, so that the third sewing line 163 performs the function of a hinge for guiding the airbag 100 to allow the airbag 100 to be deployed upward when the airbag 100 is inflated.

The margin M extends toward the top ends of the front and rear panels 110 and 130 so that the bottom ends of the front and rear flaps 112 and 132, in which the second sewing line 162 is formed. The margin M extends from the cross point C at which the first and third sewing lines 162 and 163 are crossed, by a predetermined length H.

Therefore, when the airbag 100 is inflated, the margin M pulls the airbag 100 toward the instrument panel 2, the margin M performs a function of the deployment guide member of guiding the airbag 100 to be deployed rapidly and upward.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. An airbag for a knee airbag apparatus in combination with a housing for coupling to an instrument panel of a vehicle at a housing connection portion, the housing defining an open for housing the airbag in an uninflated state, the airbag comprising:
   a front panel;
   a rear panel coupled to the front panel to define an inflation chamber; and
   a hinge portion having a first inflation thickness between the front panel and the rear panel at a position corresponding to an intersection between the opening defined by the housing and the housing connecting portion, at which the instrument panel is coupled to the housing, and a second inflation thickness between the front and rear panel proximate to the first inflation thickness when the airbag is inflated, the first inflation thickness being a reduced inflation thickness less than the second inflation thickness.

2. The airbag of claim 1, wherein a corner is defined at a junction between the housing and the housing connection portion and further wherein the hinge portion includes:
   a first tether connected to the front panel proximate to the corner when the airbag is inflated; and
   a second tether having one end sewed to the front panel adjacent to the one end of the first tether.

3. The airbag of claim 2, wherein the first and second tethers are disposed to form a predetermined angle about the corner when the airbag is inflated.

4. The airbag of claim 3, wherein the housing connecting portion is a low portion of the instrument panel which is formed in parallel with a bottom of the vehicle, the one end of the first tether is sewed to be positioned at a front of the housing connecting portion when the airbag is inflated and an opposite end of the first tether is sewed to the rear panel to face the bottom of the vehicle, and the one end of the second tether is sewed to a rear of the housing connecting portion when the airbag is inflated and an opposite end of the second tether faces tibias of a passenger.

5. The airbag of claim 1, further comprising a deployment guide member defined by seam margins of the front and rear panels formed at both sides of the hinge portion such that a pulling force is generated to allow the airbag to be deployed upward toward the instrument panel.

6. The airbag of claim 1, wherein a corner is defined at a junction between the housing and the housing connection portion and further wherein the hinge portion includes:
 a first tether connected to the front panel and the rear panel at the reduced inflation thickness.

7. The airbag of claim 6, wherein the first tether is connected to the front panel proximate to the corner when the airbag is inflated.

8. The airbag of claim 6, wherein the housing includes a rear end which meets the housing connection portion at a right angle.

9. The airbag of claim 8, wherein the corner defines a right angle.

10. The airbag of claim 8, wherein the first inflation thickness is defined along a first tether, the first tether including a first end connected to the front panel proximate the corner when the airbag is inflated and a second end connected to the rear panel.

11. The airbag of claim 10, wherein the second inflation thickness is parallel to the first inflation thickness.

12. The airbag of claim 10, further comprising a second tether having a first end connected to the front panel distally from the corner and a second end connected to the rear panel.

13. The airbag of claim 12, in combination with the housing connection portion.

14. The airbag of claim 13, wherein the housing connection portion is flat and has a length equal to a distance between the first end of the first tether and the first end of the second tether.

15. The airbag of claim 10, in combination with the instrument panel.

16. The airbag of claim 15, wherein the housing connection portion is a low portion of the instrument panel formed parallel to a bottom of the vehicle.

17. The airbag of claim 1, in combination with the instrument panel, at least one of the instrument panel and the housing defining the housing connection portion.

18. An airbag for a knee airbag apparatus which is received in a housing coupled to an instrument panel of a vehicle and inflatable in the housing, the airbag comprising:
 a front panel;
 a rear panel coupled to the front panel to define an inflation chamber;
 a hinge portion having a thin inflation thickness at a position corresponding to a housing connecting portion, at which the instrument panel is coupled to the housing, when the airbag is inflated; and
 a deployment guide member defined by seam margins of the front and rear panels formed at both sides of the hinge portion such that a pulling force is generated to allow the airbag to be deployed upward toward the instrument panel;
 wherein the front and rear panels are fabricated as one piece such that the front and rear panels face each other through a first folding line, a vertical length from the first folding line to an upper end of the rear panel is longer than a length from the first folding line to an upper end of the front panel, the front and rear panels include a front inclined end and a rear inclined end, respectively, which are gradually inclined outward from the first folding line to upper ends of the front and rear panels, the front and rear panels include front and rear flaps protruding outward from the front and rear inclined ends and symmetrical to each other about the first folding line, the front and rear flaps include:
 lower ends placed in the front and rear panels when the front and rear flaps are folded in a horizontal direction at a position spaced apart from the first folding line; and
 side ends corresponding to the front and rear inclined ends, and
 the lower ends are gradually inclined toward upper ends of the front and rear panels in an outward direction.

19. The airbag of claim 18, further comprising:
 a first sewing line for sewing lower portions of the front and rear panels folded about the first folding line;
 a second sewing line connected to the first sewing line for sewing lower ends of the front and rear flaps; and
 a third sewing line formed by sewing the front and rear panels along peripheries of the front and rear panels after lower portions of the front and rear panels are folded on the front panel such that the side ends of the front and rear flaps correspond to the front and rear inclined ends and the upper ends of the front and rear panels are aligned corresponding to each other.

20. A knee airbag apparatus comprising:
 a housing for coupling to an instrument panel of a vehicle through a housing connection portion, a corner defined at a junction between the housing and the housing connection portion; and
 an airbag including a front panel and a rear panel, the rear panel coupled to the front panel to define an inflation chamber, upon inflation, the airbag having a first inflation thickness and a second inflation thickness between the front and rear panels, the first inflation thickness at a position corresponding with the corner and being less than the second inflation thickness, the second inflation thickness disposed proximally to the first inflation thickness.

* * * * *